Nov. 13, 1956  F. H. EHNTS  2,770,507
GREASE RELIEF FITTING
Filed Dec. 3, 1954
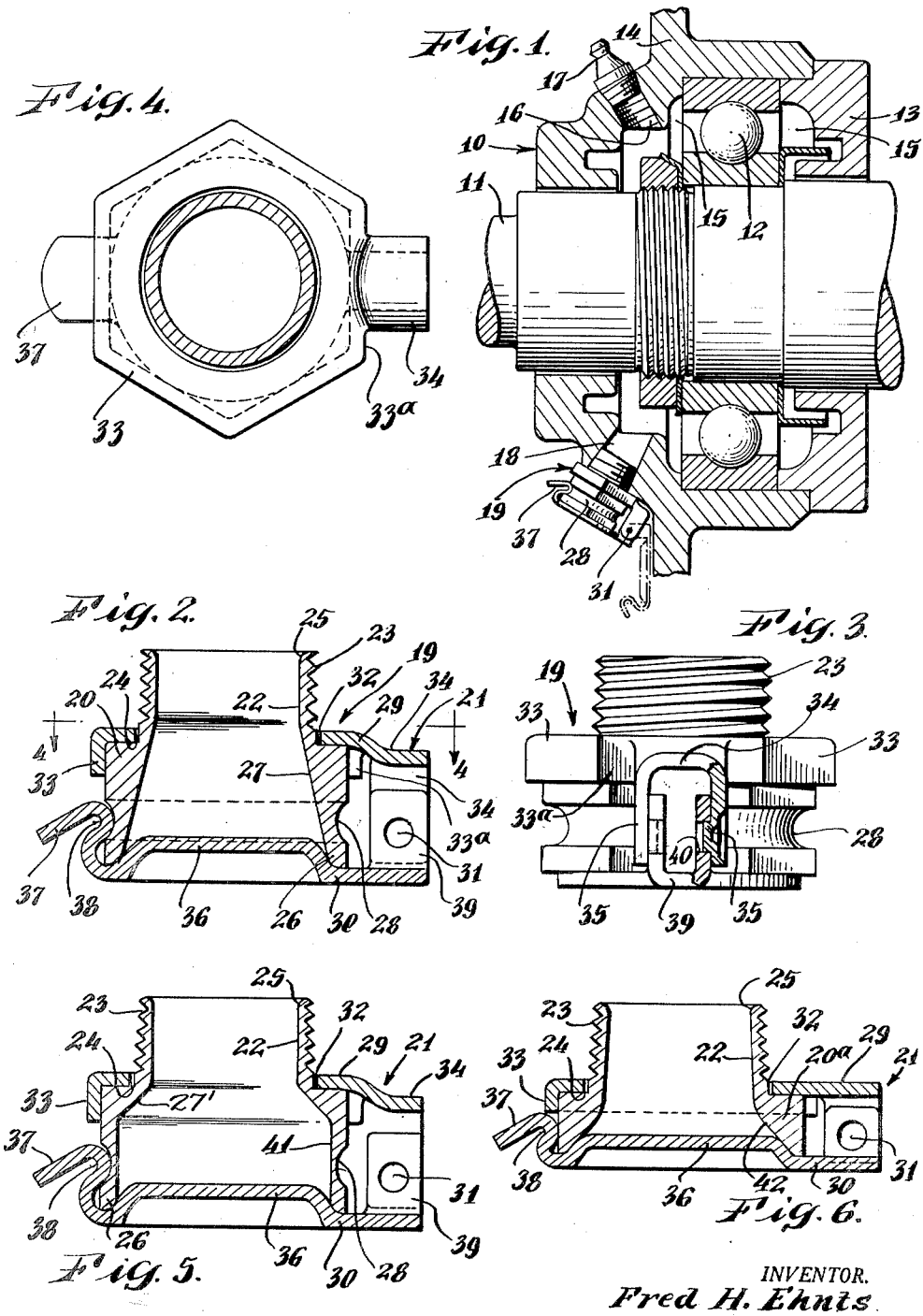
INVENTOR.
Fred H. Ehnts
BY
Churchill, Rich, Weymouth & Engel
ATTORNEYS.

United States Patent Office 2,770,507
Patented Nov. 13, 1956

2,770,507

GREASE RELIEF FITTING

Fred H. Ehnts, Philadelphia, Pa., assignor to Keystone Lubricating Company, Philadelphia, Pa., a corporation of Pennsylvania Application December 3, 1954, Serial No. 473,023

10 Claims. (Cl. 308—187)

The present invention relates to grease relief fittings and aims to provide certain improvements therein.

The maintenance of proper lubrication of antifriction bearings in general, pillow blocks and the like, and bearings in electric motors in particular, has long posed a problem which has not as yet been solved by lubrication engineers. This problem will be apparent when one realizes that the life of an anti-friction bearing is essentially the life of the grease that is charged into said bearing; that the grease has a definite life depending upon its composition, consistency, quantity and service it is to render; and that re-greasing of the bearing is required or the bearing will fail. Since re-lubrication is necessary, it is only sensible to provide adequate and convenient means for accomplishing this. Hence, bearing housings of many fractional and most integral horse power motors are equipped with a pressure-gun fitting screwed into the upper end of a generally vertical passage in the end shield leading to the bearing housing and with a relief plug screwed into a second generally vertical passage which extends from the bottom of the housing through the end shield.

In greasing bearings of the general type described, the procedure is substantially as follows: (1) the pressure-gun fitting, bearing housing, and relief plug must be wiped clean to make certain that no dirt gets into the bearing with the grease; (2) the relief plug must be removed from the bottom of the bearing housing before using the grease gun to prevent putting in an excessive quantity of grease and building up pressure inside of the bearing housing; (3) the relief hole must then be cleaned with a screw-driver or similar tool to free the relief hole of any hardened grease so that any excess grease will run freely from the bearing; (4) grease is then charged into the bearing housing through the pressure-gun fitting until some of the grease comes through the relief opening; (5) the motor is then allowed to run long enough after adding the grease to permit the rotating parts of the bearing to expel all excess grease; and (6) the relief plug must then be replaced and the outside of the housing wiped clean. In seeking to carry out the foregoing procedure it not infrequently happens that sufficient tolerance is not provided for engagement of the screw plug by a wrench to enable the removal and replacement of the plug. Also, once the plug is removed, there is ever present the danger that it may be misplaced or not replaced, or when replaced, that it may have become contaminated with a foreign substance which could find its way into the bearing to the detriment thereof. Furthermore, the procedure outlined requires a considerable amount of time.

It is accordingly an object of the present invention to provide a grease relief fitting which will obviate the disadvantages and objections to the removable relief plugs as hereinabove set forth. It is a further object of the present invention to greatly simplify and substantially reduce the time required for grease lubricating anti-friction bearings.

The foregoing and other objects of the invention not specifically enumerated, I accomplish by replacing the relief plug now conventionally employed, by a relief fitting which will engage within the screw plug relief opening, where it will remain, said relief fitting having a releasable captive cap which can be operated manually to stay in an open or closed position and said fitting having a sufficiently large bore therethrough which will offer a minimum restriction of the relief opening to the outflow of grease therefrom when the bearing has been charged with sufficient grease.

The invention, consisting of its various parts and combinations, will be readily understood from the detailed description which follows, when considered in connection with the accompanying drawings showing several embodiments and wherein:

Figure 1 shows a diametrical section through a typical shielded anti-friction bearing housing, to which the relief fitting of my invention has been applied.

Fig. 2 shows, on an enlarged scale, an axial section through the relief fitting shown in Fig. 1.

Fig. 3 shows an elevation of the fitting of Fig. 2 taken at a right angle as viewed from the right-hand side thereof.

Fig. 4 shows a section taken along line 4—4 of Fig. 2.

Figs. 5 and 6 show axial sections corresponding to Fig. 2, of two additional embodiments of the invention.

Referring first to Fig. 1 of the drawings wherein the invention is shown in its environmental setting, the reference numeral 10 indicates a typical anti-friction bearing housing supporting a rotatable shaft 11 which is to be lubricated and separated from said shaft by the anti-friction ball bearing 12. The bearing housing 10, as shown, consists of an inner cap 13 and an end shield 14 which provides a grease chamber 15, the top of the end shield having formed therein a generally vertical screw-threaded passage 16 leading to the grease chamber, a grease-gun fitting 17 being mounted in said passage and said end shield being formed with a second generally vertical screw-threaded passage 18 leading upwardly from the bottom of the shield to the bottom of the grease chamber, which passage, in conventional bearing housings, is fitted with a removable grease relief plug. In lieu of the removable grease plug heretofore conventionally employed, the present invention contemplates mounting within the passage 18 a novel form of grease relief fitting, herein indicated as a whole by the reference numeral 19.

Referring now to Figs. 2, 3 and 4, the grease relief fitting 19 may be said to consist of a body member 20 and a closure assembly 21.

The body member 20 is of generally regular polygonal form and has an axial bore 22 extending therethrough, one end of which provides a grease inlet. The grease inlet end of the body portion is reduced in size and externally screw-threaded to provide a nipple portion 23 adapted for mounting the fitting within the passage 18 in the bearing housing, the nipple forming with the remainder of the body member a shoulder 24. The bore 22 is smooth and of a size such that the minimum diameter thereof is only slightly less than the diameter of the passage 18 so as to reduce to a minimum the resistance to the flow of grease received therein from the grease chamber 15. To further reduce the resistance to flow of the grease from the grease chamber to the fitting, the bore 22 at its outer or grease inlet end is countersunk or flared outwardly, as shown at 25. It will be understood that the opposite or grease outlet end 26 of the bore 22 when unobstructed, i. e., when the closure member, presently to be described, is in open position, constitutes the relief opening of the fitting. The bore 22 below or beyond the nipple portion 23 is preferably flared outwardly, as shown at 27, the juncture of the flared portion with the cylindrical portion of the bore being provided by a smooth convex surface and the outward flaring extends to the relief or grease outlet end 26. By so increasing the diameter of the bore by the flared portion, lessens the adherence of the grease to the wall of the fitting, causing a shearing of the grease and hence a minimum resistance to outflow of grease through the fitting. The exterior of the body member 20 adjacent the relief opening 26 is formed with an annular groove 28, for a purpose presently to be described.

The closure assembly 21 consists of a pair of coaxially disposable members 29 and 30 which are preferably formed of resilient sheet material and are articulated together to pivot about an axis 31. The member 29 is termed a cap member and the member 30 is termed a closure member. The member 29 is formed with a circular opening 32 adapted to engage over the nipple portion 23 and with depending and preferably struck-up side walls 33 to provide a polygonal socket which is complemental and adapted to engage over the polygonal walls of the body member 20. Projecting outwardly and downwardly from one of the side walls 33a is a U-shaped arm 34, the opposed side walls of which are formed with axially aligned, indented portions to provide pivot pins 35. The closure member 30 has a central circular struck-up portion 36 adapted to snugly fit within the end of the relief opening 26, and extending from diametrically opposite sides of said circular portion is an upwardly bent lip 37 having a re-entrant bent portion 38 and an upwardly bent U-shaped arm 39, the opposed side walls of which are formed with axially aligned openings 40 to accommodate the pivot pins 35 on the cap member 29. The sheet material from which the cap member 29 and closure member 30 are formed being resilient, the pivoted connection between said members is simply and economically accomplished by merely snapping the U-shaped arm 39 into the U-shaped arm 34 so that the pivot pins 35 engage in the holes 40.

In use, the closure assembly 21 is mounted on the body member 20, the closure member 30 being moved outwardly about the pivot 31 to permit positioning of the cap member 29 over the nipple 23, after which the closure member is snapped into closed relation to outlet end of the bore in the body member with the detent 38 engaging in the annular recess 28, the nipple is then screwed into the passage 18 to clamp the cap member between the shoulder 24 on the body member and the end shield 14. If, when this is done, the lip 37 is not brought into proper position for engagement by the finger of an operator, the fitting may be withdrawn, the cap member 29 released from the body portion and rotated the proper amount to bring the lip portion in desired position when the fitting is again screwed into the bearing housing.

With a grease relief fitting such as described substituted for the conventional relief plug, it will be appreciated that in greasing the bearing it will no longer be necessary to remove the fitting but merely to snap open the closure member until lubrication of the housing is completed, and thereafter snap the closure member closed. It will thus be appreciated that a substantial saving in time results from the use of the present invention and, in addition thereto, all danger of misplacement, failure to replace the relief plug or danger of having foreign matter contaminate the grease within the housing, are eliminated.

The grease relief fitting shown in Fig. 5 is substantially the same as that in Figs. 2 to 4, with the exception that the enlargement at the relief end of the fitting is provided by enlarging the bore to a uniform diameter, as shown at 41, for a substantial axial distance. The flared portion 27' connects the enlarged bore and the nipple portion of the bore of the fitting.

The embodiment shown in Fig. 6 shows a body portion 20a of less radial dimension than the previous embodiments described and, because of said shortened length, the annular groove 28 had to be omitted. However, it has been found that by virtue of the fact that the closure member 30 is formed of resilient sheet material, the bent back detent portion 38 on the lip 37 provides, together with the resiliency of the struck-up circular portion 36, sufficient frictional holding engagement of the closure member in closing position on the body member. In this embodiment it will also be noted that the bore 22 through the body portion is of substantial uniform diameter throughout its nipple portion length with the exception of the flared portion 42 at the relief end. In tests of the several embodiments, it has been shown that where the fitting is formed with an enlarged outward flaring of the bore 22 below the nipple portion, that the device is more efficient than where such outward flaring is not provided. It will be understood that the grease relief fittings embodying my invention may be used as substitutes for relief plugs on either new or old equipment.

While I have shown and described several embodiments of my invention, it is to be understood that changes in details of construction may be made in the fittings within the range of mechanical and engineering skill, without departing from the spirit of the invention as hereinafter claimed.

What I claim is:

1. A grease relief fitting for use in lieu of the conventional removable relief plug in an anti-friction bearing housing and the like, said fitting consisting of a body member and a closure assembly, said body member having a smooth axial bore therethrough, one end of which provides a grease inlet for the fitting, said inlet end of the body member being formed with a nipple portion surrounding said bore having means for engaging and securing said fitting within the grease relief opening in a bearing housing, the opposite end of said bore being enlarged and providing a grease outlet or relief opening, the minimum diameter of the axial bore being only slightly less than the diameter of the hole in the bearing housing into which the grease inlet end of the fitting is adapted to be mounted, the bore in the body member inwardly beyond the nipple portion flaring outwardly toward the grease outlet end whereby to provide maximum relief and minimum resistance to outflow of grease through the fitting, and said closure assembly comprising a manually operable closure member movable into and out of closing relation to the said opposite end of the bore and means for captively holding said closure member in open or closing position onto the fitting.

2. A grease relief fitting according to claim 1, wherein the flared portion of the bore extends from approximately the inner end of the nipple portion to the grease outlet end of the bore.

3. A grease relief fitting according to claim 1 wherein the means on the body member for securing said fitting within the grease relief opening in the bearing housing is a screw-threaded nipple which forms a shoulder on the body member and the second of said members of the closure assembly is a part engaging over said nipple and seating on said shoulder.

4. A grease relief fitting for an anti-friction bearing housing and the like formed with a grease relief opening, said fitting consisting of a tubular body member and a closure assembly, said tubular body member having at one end a grease inlet and means for securing said fitting within the grease relief opening in a bearing housing and at its other end a grease outlet or relief opening, said closure assembly comprising a pair of coaxially disposable articulated members, a first of said members being a manually operable closure member for the relief opening in the tubular body member and a second of said members being coaxially mounted on the tubular body member over the means thereon for securing the grease inlet end thereof within the grease relief opening in the bearing housing the means on the body member for securing said fitting within the grease relief opening in the bearing housing being a screw-threaded nipple which forms a shoulder on the body member and the second of said members of the closure assembly is a part engaging over said nipple and seating on said shoulder, and further, wherein said body member and said second of said members have complemental polygonal surfaces whereby the closure assembly can be mounted in different angular positions around the axis of the body member.

5. A grease relief fitting according to claim 4 wherein cooperating means are formed on the manually operable closure member on the body member for holding the closure member in closing position.

6. A grease relief fitting according to claim 5 wherein the cooperating means are a resilient detent on the closure member and a complemental recess in the body member.

7. A grease relief fitting according to claim 1 wherein the bore at the grease inlet end of the nipple is countersunk or flared outwardly to provide minimum resistance to flow of grease from the bearing housing relief opening into the fitting when said fitting is mounted in a bearing housing relief opening.

8. A grease relief fitting for an anti-friction bearing housing and the like formed with a grease relief opening, said fitting consisting of a body member and a closure assembly, said body member being of external polygonal form and having an axial bore therethrough and at one end being formed with a reduced externally threaded nipple portion surrounding said bore for engaging and securing said fitting within the grease relief opening in a bearing housing, the opposite end of said bore providing a grease relief opening, said closure assembly comprising a pair of coaxially disposable articulated members, a first of said members being a manually operable closure member for the relief opening in the body member, the second of said articulated members being coaxially mounted on the body member over the nipple thereof and having side walls engaging the walls of the polygonal body member and adapted to be clamped between said body member and the bearing housing, and the first of said articulated members being formed of resilient sheet material and being movable into and out of closing relation to the relief opening in the body member, and resiliently engage said body member to hold the closure member in closing relation thereto.

9. A grease relief fitting according to claim 8 wherein the first of said articulated member has a projecting lip disposed diametrically opposite to the articulated mounting, and said lip has a return bent portion for frictional holding engagement onto a side wall of the body member.

10. A grease relief fitting according to claim 9 wherein the exterior of the body member adjacent the relief opening therein is formed with an annular groove within which the return bent portion of the projecting lip on the closure member is engageable.

References Cited in the file of this patent
UNITED STATES PATENTS

| | | |
|---|---|---|
| 876,000 | Hyatt | Jan. 7, 1908 |
| 1,633,420 | Schlayer | June 21, 1927 |
| 1,923,767 | Weldon | Aug. 22, 1933 |
| 1,954,685 | Stanton | Apr. 10, 1934 |
| 2,164,449 | Delaval-Crow | July 4, 1939 |